United States Patent
Fujii et al.

(10) Patent No.: US 7,422,335 B2
(45) Date of Patent: Sep. 9, 2008

(54) VARIABLE-SHAPE MIRROR AND OPTICAL PICKUP DEVICE THEREWITH

(75) Inventors: Hitoshi Fujii, Osaka (JP); Susumu Sugiyama, Shiga (JP); Akira Ishii, Shiga (JP); Katsuhiko Tanaka, Shiga (JP); Wataru Kuze, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 11/406,498

(22) Filed: Apr. 19, 2006

(65) Prior Publication Data

US 2006/0256457 A1  Nov. 16, 2006

(30) Foreign Application Priority Data

Apr. 19, 2005 (JP) .............................. 2005-121658

(51) Int. Cl.
    *G02B 5/08* (2006.01)
(52) U.S. Cl. ...................................................... 359/846
(58) Field of Classification Search ......... 359/846–849, 359/212, 224, 290–292, 295
    See application file for complete search history.

(56) References Cited

U.S. PATENT DOCUMENTS

| 4,226,507 | A | * | 10/1980 | Fuschetto ................... 359/849 |
|---|---|---|---|---|
| 4,934,803 | A | * | 6/1990 | Ealey ......................... 359/845 |
| 4,940,318 | A | * | 7/1990 | Ealey et al. .................. 359/849 |
| 5,357,825 | A | * | 10/1994 | Costello et al. ........... 74/490.07 |
| 5,359,252 | A | * | 10/1994 | Swift et al. ................. 310/328 |
| 6,193,381 | B1 | * | 2/2001 | Holler ......................... 359/849 |
| 6,421,417 | B1 | * | 7/2002 | Jiang et al. ..................... 378/84 |
| 6,844,994 | B2 | * | 1/2005 | Melzer et al. ............... 359/824 |
| 6,948,821 | B2 | * | 9/2005 | Menck ........................ 359/846 |

FOREIGN PATENT DOCUMENTS

| JP | A-05-333274 | 12/1993 |
|---|---|---|
| JP | A-2003-172811 | 6/2003 |
| JP | A-2004-109562 | 4/2004 |

\* cited by examiner

*Primary Examiner*—Alessandro Amari
*Assistant Examiner*—Mark Consilvio
(74) *Attorney, Agent, or Firm*—Morgan, Lewis & Bockius LLP

(57) ABSTRACT

In a variable-shape mirror of which the shape of the mirror surface can be varied, a mirror portion is bonded only to a fixed portion and not to a piezoelectric element. When the piezoelectric element is not operating, the mirror portion, receiving a predetermined force from the piezoelectric element, makes contact with the piezoelectric element. When the piezoelectric element contracts, the mirror portion tends to restore its original shape by its counterforce. Thus, even when the piezoelectric element contracts, the contact between the mirror portion and the piezoelectric element is held, and hence the electric conduction to the piezoelectric element is maintained.

11 Claims, 7 Drawing Sheets

VARIABLE-SHAPE MIRROR AND OPTICAL PICKUP DEVICE THEREWITH

This application is based on Japanese Patent Application No. 2005-121658 filed on Apr. 19, 2005, the contents of which are hereby incorporated by reference.

BACKGROUND OF THE INVENTION

1. Field of the Invention

The present invention relates to a variable-shape mirror that permits the shape of a mirror surface thereof to be varied, and more particularly relates to prevention of the deformation that occurs when the mirror surface of a variable-shape mirror is varied. The present invention also relates to an optical pickup device provided with a variable-shape mirror of which the mirror surface is prevented from deformation.

2. Description of Related Art

When information is read from or written to an optical disc such as a CD (compact disc) or DVD (digital versatile disc) by the use of an optical pickup device, the relationship between the optical axis of the optical pickup device and the disc surface should ideally be perpendicular. In reality, however, when the disc is rotating, their relationship does not always remain perpendicular. As a result, with an optical disc such as a CD or DVD, when its disc surface becomes inclined relative to the optical axis, the optical path of laser light is so bent as to produce coma aberration.

When coma aberration is produced, the spot of laser light shone on the optical disc deviates from the proper position, and, when the coma aberration becomes larger than permitted, inconveniently, it becomes impossible to accurately write or read information. For this reason, there have conventionally been proposed methods for correcting coma aberration as described above and other aberrations by the use of a variable-shape mirror.

For example, JP-A-H5-333274 proposes a method of performing phase control by varying the shape of the mirror itself of a variable-shape mirror by the use of a plurality of actuators. Disadvantageously, however, this method is unsuitable for use in a small component such as an optical pickup device because it does not take wiring and other factors into consideration. Moreover, it is difficult, both technically and in terms of cost, to miniaturize multi-layered piezoelectric elements used as those actuators.

JP-A-2003-172811 proposes a variable-shape mirror that has, between a mirror portion and a mirror support portion supporting the mirror, a sealed space that is filled with a fluid material such as a liquid, gaseous, or gel material. According to the discloser, by this method, it is possible to properly control the flatness of the initial shape of the mirror surface of the mirror portion. Disadvantageously, however, it is technically rather difficult to provide a sealed space in a variable-shape mirror. Moreover, even though the flatness in the initial state is maintained, the mirror surface may deform when the shape of the mirror is varied. If the mirror surface deforms, it is impossible to correct coma aberration.

JP-A-2004-109562 proposes a method, for use in a wavefront aberration correction mirror that corrects aberrations by displacing the mirror surface of a mirror base by the use of a piezoelectric element, whereby, for the purpose of reducing the deformation of the mirror due to the presence of adhesive, the adhesive layer between the mirror base and the piezoelectric element is formed thin. Disadvantageously, however, by this method, certainly the adhesive layer can be formed thin, but, since the mirror and the piezoelectric element are bonded together with adhesive, when the shape of the mirror is varied with the piezoelectric element, the mirror surface may locally deform. When deformation due to the mirror and the piezoelectric element being bonded together occurs, as described above, it is impossible to properly correct coma aberration.

Incidentally, a variable-shape mirror is required to be designed to offer as large a mirror displacement as possible, because, with an insufficient mirror displacement, it is impossible to satisfactorily correct aberrations.

SUMMARY OF THE INVENTION

In view of the conventionally encountered inconveniences discussed above, it is an object of the present invention to provide a variable-shape mirror that can vary the shape of the mirror surface thereof wherein, when the shape of the mirror surface is varied with a piezoelectric element, the mirror surface is prevented from local deformation. It is another object of the present invention to provide a variable-shape mirror that, despite being so structured as to prevent the mirror surface thereof from local deformation, offers a sufficiently wide mirror shape variation range. It is still another object of the present invention to provide an optical pickup device that is provided with a variable-shape mirror of which the mirror surface is prevented from local deformation and that can thus properly correct aberrations in a wide range.

To achieve the above objects, according to one aspect of the present invention, a variable-shape mirror is provided with: a support base; a mirror portion that is disposed to face the support base and that has a mirror surface on the side thereof facing away from the support base; a piezoelectric element that is sandwiched between the support base and the mirror portion and that varies the shape of the mirror surface; and a fixed portion that is sandwiched between the support base and the mirror portion and that is disposed closer to the outer edge of the mirror portion than the piezoelectric element is. Here, the mirror portion is bonded only to the fixed portion so that, when the piezoelectric element is not operating, the mirror portion, receiving a predetermined force from the piezoelectric element, makes contact with the piezoelectric element and, while keeping contact with the piezoelectric element, is displaced in the same direction in which the piezoelectric element contracts.

With this structure, in the variable-shape mirror that can vary the shape of the mirror surface thereof, the piezoelectric element is not bonded to the mirror portion. Thus, even when the piezoelectric element expands or contracts, the mirror surface of the mirror portion is prevented from local deformation due to the piezoelectric element and the mirror portion being bonded together. Moreover, when the piezoelectric element is not operating, the mirror portion receives a predetermined force from the piezoelectric element. Thus, even when the piezoelectric element contracts, the counterforce of the mirror portion can be exploited to hold the contact between the mirror portion and the piezoelectric element and hence to maintain the electrical conduction to the piezoelectric element. Thus, it is possible to obtain a shape variation range of the mirror portion corresponding to the expansion and contraction range of the piezoelectric element just as in a case where the mirror portion and the piezoelectric element are bonded together.

According to the present invention, in the variable-shape mirror structured as described above, the mirror portion may have a projection formed in a part thereof where it makes contact with the piezoelectric element.

With this structure, a projection is formed in the part of the mirror portion where it makes contact with the piezoelectric element. Thus, when the mirror portion is bonded to the fixed portion, the mirror portion can receive a force from the piezoelectric element. When the piezoelectric element contracts, the counterforce of the mirror portion can be exploited to hold the contact between the mirror portion and the piezoelectric element.

According to the present invention, in the variable-shape mirror structured as described above, the mirror portion may have the mirror-surface side thereof formed concave.

With this structure, since the mirror portion is so shaped that the mirror-surface side thereof is concave, when the mirror portion is bonded to the fixed portion, the mirror portion can receive a force form the piezoelectric element. When the piezoelectric element contracts, the counterforce of the mirror portion can be exploited to hold the contact between the mirror portion and the piezoelectric element.

According to the present invention, in the variable-shape mirror structured as described above, the length of the piezoelectric element in the direction perpendicular to the support base may be larger than the length of the fixed portion as measured from the inner face of the support base to where the fixed portion is bonded to the mirror portion.

With this structure, when, of the support base and the mirror portion, the former is placed at the bottom, with respect to the upper side thereof, the height of the piezoelectric element is greater than that of the fixed portion. Thus, when the mirror portion is bonded to the fixed portion, the mirror portion can receive a force form the piezoelectric element. When the piezoelectric element contracts, the counterforce of the mirror portion can be exploited to hold the contact between the mirror portion and the piezoelectric element.

According to the present invention, in the variable-shape mirror structured as described above, four of the piezoelectric element may be provided symmetrically in cross-shaped directions.

With this structure, since four piezoelectric elements are provided symmetrically, it is possible to vary the shape of the mirror surface in a well-balanced fashion.

According to another aspect of the present invention, an optical pickup device is provided with the variable-shape mirror structured as described above.

With this structure, it is possible to prevent the mirror surface of the variable-shape mirror from local deformation, and to obtain a wide mirror shape variation range while preventing deformation. Thus, it is possible to surely correct aberrations in a wide range.

DETAILED DESCRIPTION OF PREFERRED EMBODIMENTS

Figure 1A:
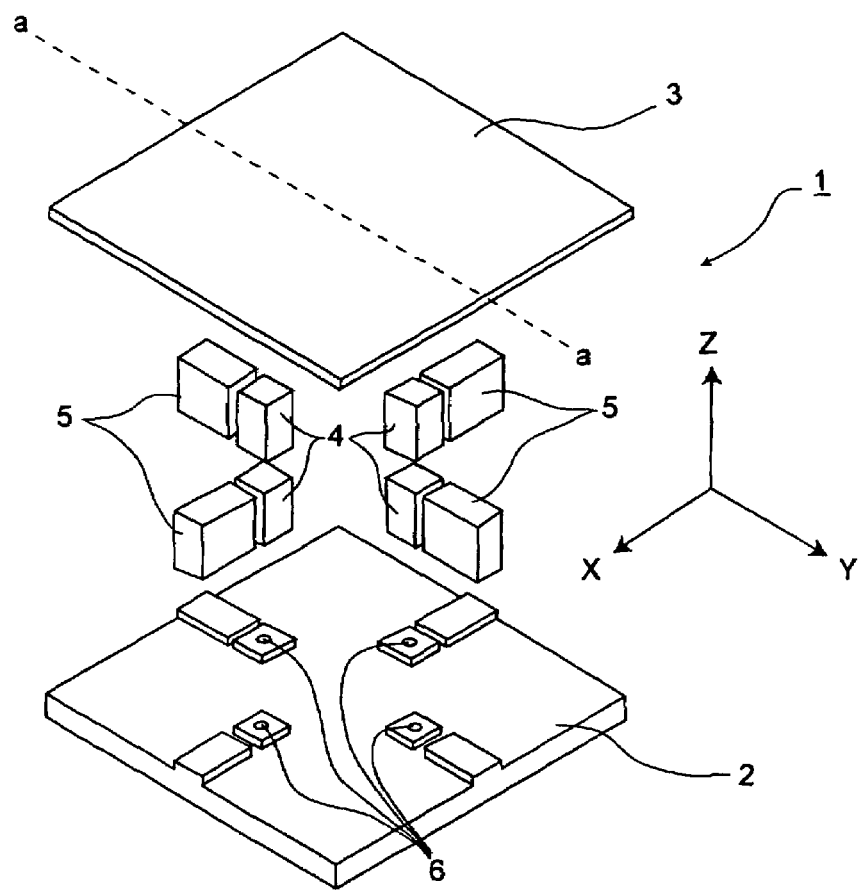
FIG. 1A is a diagram showing the structure of the variable-shape mirror of a first embodiment of the present invention, showing the components thereof in an exploded perspective view.

Hereinafter, embodiments of the present invention will be described with reference to the accompanying drawings. It should be understood that the embodiments described below are merely examples, and are therefore not meant to limit in any way the manner in which the present invention can be carried. It should also be understood that, in the drawings, the sizes and thicknesses of the components, the amount of displacement that takes place when the shape is varied, etc. are exaggerated for the purpose of easy understanding, and therefore these dimensions are different from those actually observed.

Figure 1B:
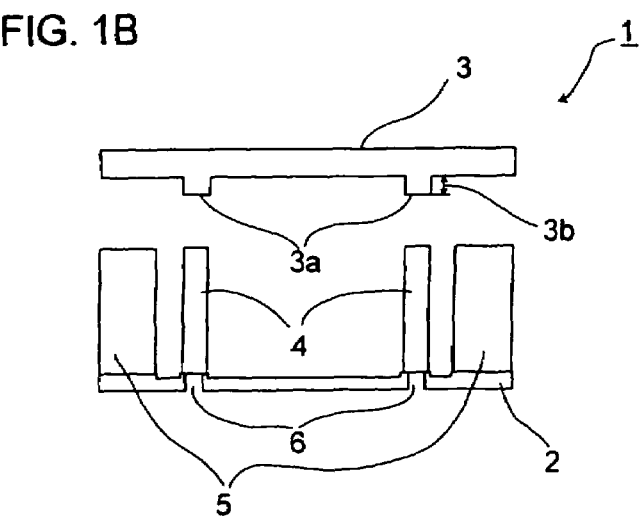
FIG. 1B is a sectional view of the variable-shape mirror of the first embodiment, as cut along line a-a shown in FIG. 1A.
Figure 1C:
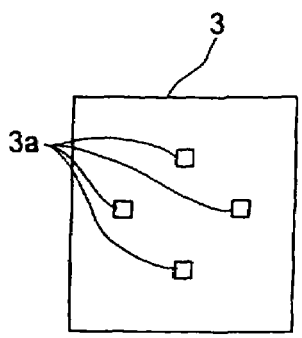
FIG. 1C is a front view of the mirror portion of the variable-shape mirror of the first embodiment, as seen from behind the mirror surface.

FIG. 1A is a diagram showing the structure of the variable-shape mirror of a first embodiment of the present invention, showing the components thereof in an exploded perspective view. FIG. 1B is a sectional view cut along line a-a shown in FIG. 1A. FIG. 1C is a front view of the mirror portion of the variable-shape mirror, as seen from behind the mirror surface.

Reference numeral 1 represents a variable-shape mirror according to the present invention, and reference numeral 2 represents a support base on which piezoelectric elements 4 and fixed portions 5 are fitted. The support base 2 is formed of, for example, an insulating ceramic material such as glass. The support base 2 has electrode holes 6 formed therein through which a voltage is fed to the piezoelectric elements 4.

Reference numeral 3 represents a mirror portion that reflects the light emitted from a light source. The mirror portion 3 is formed of, preferably, a material that is rigid and that is electrically conductive so as to be able to feed a voltage to the piezoelectric elements 4. Examples of such a material include silicon and metals such as aluminum and iron. The mirror portion 3 may be formed of an insulating material such as glass, though it then does not offer electrical conductivity. In a case where the mirror portion 3 is formed of an insulating material such as glass, to achieve electrical conduction to the piezoelectric elements 4, it is necessary to form, on the side of the mirror portion 3 opposite to the mirror surface thereof, an electrode pattern by vapor-depositing gold or the like, or to fit an electrode to the side of the mirror portion 3 opposite to the mirror surface thereof.

That is, when the mirror portion 3 is formed of an insulating material, it is built as a member including an electrode portion (unillustrated) that is provided on the side of the mirror portion 3 opposite to the mirror surface thereof and that makes the piezoelectric elements 4 operate. The mirror portion 3 may be formed of a single material. Alternatively it is also possible to form a base portion of the minor portion 3 with silicon and then coat the top side thereof by laying a coating of aluminum or the like to form a mirror surface. It is also possible to form a plurality of layers on the base portion.

As shown in FIGS. 1B and 1C, the mirror portion 3 has, on the side thereof opposite to the mirror surface, projections 3a formed in the parts where the mirror portion 3 makes contact with the piezoelectric elements 4. These projections 3a are formed, for example in a case where the mirror portion 3 is formed of silicon, by dry etching as described below. The projections 3a may be formed by any process other than dry etching.

First, on the surface of a silicon wafer, photosensitive resin as photoresist is applied. Then, exposure is performed to form a mask pattern on the silicon wafer having the photoresist applied thereto. Next, through development, the part other than where the projections are to be formed is removed to form a resist pattern. Then, the silicon in the part other than where it is masked with the resist is etched with an etching gas such as chlorine. Then, the resist forming the mask is removed to obtain a silicon wafer having the desired projections formed thereon.

If the projection height 3b of the projections 3a formed on the side of the mirror portion 3 opposite to the mirror surface is small, when the piezoelectric elements 4 contract, the projections 3a may fail to make contact with the piezoelectric elements 4. To prevent this, the projection height 3b is so adjusted that the projections 3a are displaced as much as the piezoelectric elements 4 contract. The size with which the projections 3a are formed on the side opposite to the mirror surface is restricted only by the size of the components like the mirror portion 3 itself; that is, so log as the projections 3a can make contact with the piezoelectric elements 4, they may be formed larger or smaller than the top faces of the piezoelectric elements 4 shown in FIG. 1B. In this embodiment, as shown in FIG. 1C, the projections 3a are rectangular; these, however, may be given any other shape, for example circular.

As shown in FIG. 1A, the piezoelectric elements 4 are sandwiched between the support base 2 and the mirror portion 3, and four of them are arranged symmetrically in cross-shaped directions. Moreover, for example as shown in FIG. 1B, the piezoelectric elements 4 are connected to individual electrodes (unillustrated) through the electrode holes 6 formed at the bottom faces of the piezoelectric elements 4. The top faces of the piezoelectric elements 4 make contact with the projections 3a, which also serve as a common electrode, of the mirror portion 3, and this permits the piezoelectric elements 4 to expand and contract. In a case where, as described above, the mirror portion 3 is formed of an insulating material, an electrode layer is vapor-deposited on the side thereof opposite to the mirror surface to provide an electrode on the mirror portion 3, and this electrode is used as a common electrode.

The piezoelectric elements 4 are formed of a piezoelectric ceramic such as PZT (lead zirconate titanate, $Pb(Zr_xTi_{1-x})$) or a piezoelectric polymer such as polyvinylidene fluoride. Among these, a piezoelectric ceramic material is preferable for its high mechanical strength.

In this embodiment, the piezoelectric elements 4 are rectangular-column-shaped; these, however, may be given any other shape, for example circular-columnar, or may be formed finer at the ends thereof making contact with the mirror portion 3. There may be provided any number of piezoelectric elements 4 in any arrangement other than specifically described in this embodiment. However, to vary the shape of the mirror surface of the mirror portion 3 uniformly at different positions, it is preferable that a plurality of piezoelectric elements 4 be provided symmetrically; when the size of the mirror portion 3 and other factors are taken into consideration, it is preferable that four piezoelectric elements 4 be arranged symmetrically in cross-shaped directions. In a case where a plurality of piezoelectric elements 4 are provided, it is preferable to adjust the heights of the piezoelectric elements individually so as to prevent deformation on the mirror surface of the mirror portion 3. To more properly vary the shape of the mirror surface, it is preferable that the piezoelectric elements 4 be arranged symmetrically in cross-shaped directions about an axis passing through the center of the mirror surface of the mirror portion 3 as seen in a plan view.

Reference numeral 5 represents fixed portions. As shown in FIGS. 1A and 1B, the fixed portions S are sandwiched between the support base 2 and the mirror portion 3, and are disposed outside the piezoelectric elements 4 arranged symmetrically in cross-shaped directions. The fixed portions 5 are, at the top faces thereof, bonded to the mirror portion 3. In this embodiment, the fixed portions 5 are separate from the support base 2; alternatively, the support base 2 and the fixed portions 5 may be formed integrally, or may be given any other shapes or otherwise modified within the objects of the present invention. It is preferable that the heights of the individual fixed portions 5 be made equal to prevent deformation on the mirror surface of the mirror portion 3, and it is also preferable that the relationship between the heights of the fixed portions 5 and the piezoelectric elements 4 be so adjusted as not to produce deformation.

In this embodiment, as shown in FIGS. 1A to 1C, the variable-shape mirror 1 as a whole is given the shape of a rectangular parallelepiped; its shape, however, is not limited to this particular shape, but may be modified within the objects of the present invention. For example, the support base 2, the mirror portion 3, or any other components may be formed circular, and the support base 2 may be formed larger than the mirror portion 3.

Figure 2A:
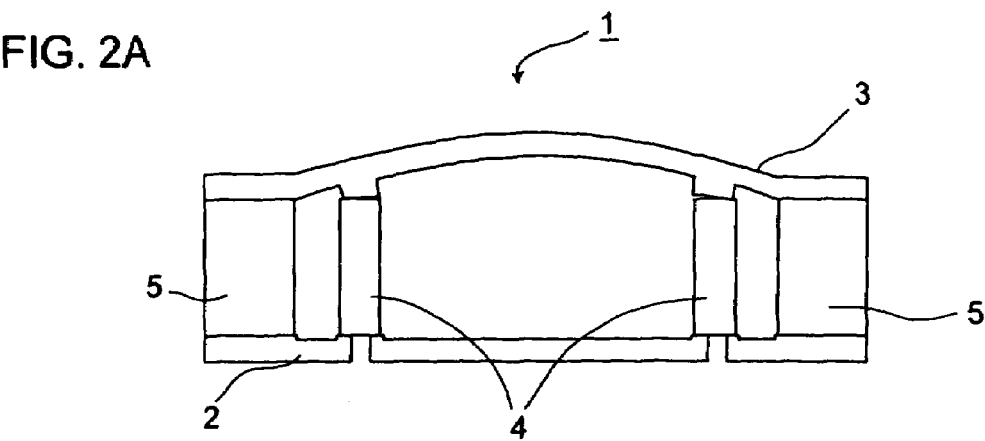
FIG. 2A is a sectional view of the variable-shape mirror of the first embodiment, as cut along line a-a shown in FIG. 1A, illustrating the operation of the variable-shape mirror.
Figure 2B:
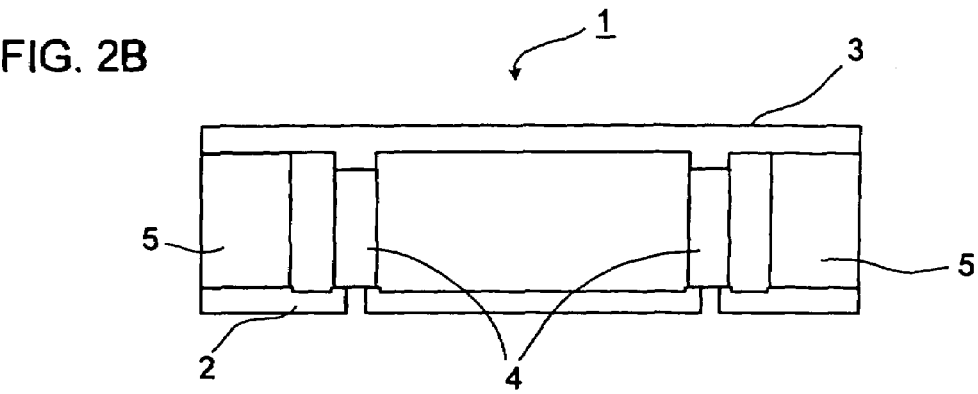
FIG. 2B is a sectional view of the variable-shape mirror of the first embodiment, as cut along line a-a shown in FIG. 1A, illustrating the operation of the variable-shape mirror.
Figure 2C:
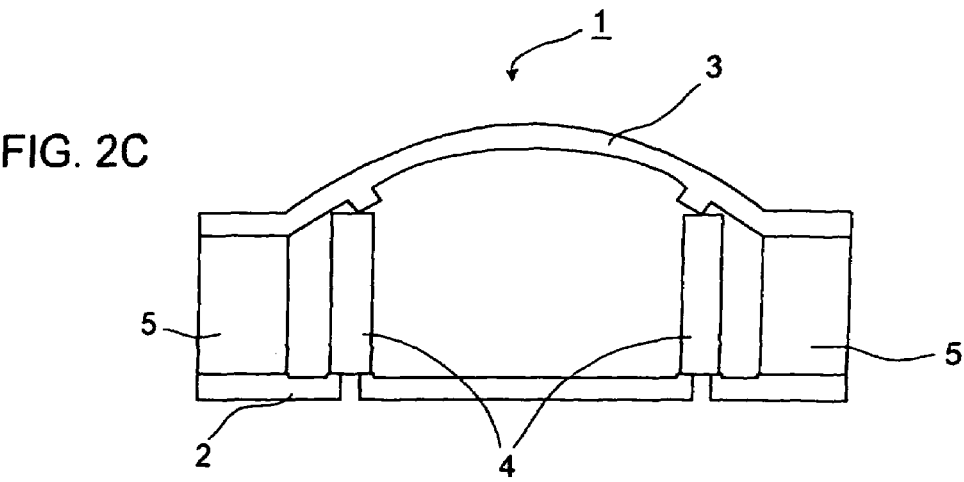
FIG. 2C is a sectional view of the variable-shape mirror of the first embodiment, as cut along line a-a shown in FIG. 1A, illustrating the operation of the variable-shape mirror.

Now, the operation of the variable-shape mirror 1 structured as described above will be described with reference to FIGS. 2A, 2B, and 2C. For example, as the piezoelectric elements 4 are driven, the variable-shape mirror 1 varies the shape thereof as shown in FIGS. 2A to 2C. FIGS. 2A to 2C are sectional views of the variable-shape mirror 1 as cut along line a-a shown in FIG. 1A.

FIG. 2A shows a state in which no voltage is applied to the piezoelectric elements 4. The mirror portion 3 receives a force from the piezoelectric elements 4, and is thereby bent. When a voltage is applied to the piezoelectric elements 4, they expand or contract in the vertical direction i.e. in a direction normal to the surface of the support base. FIG. 2B shows a state in which the piezoelectric elements 4 have contracted. When the piezoelectric elements 4 contract, the mirror portion 3, since it is not bent from the beginning, tends to restore, by its counterforce, the shape shown in FIG. 2B from the state shown in FIG. 2A. Thus, if the projection height 3b (see FIG. 1B) of the mirror portion 3 is so adjusted that the projections 3a are displaced as much as the piezoelectric elements 4 contract, even when the piezoelectric elements 4 have contracted, no gaps are left between the piezoelectric elements 4 and the variable-shape mirror 1, and thus the electrical conduction to the piezoelectric elements 4 is maintained. FIG. 2C shows a state in which the piezoelectric elements 4 have expanded. In this way, the variable-shape mirror 1 permits the shape of the mirror surface of the mirror portion 3 to be varied all over the maximum range in which the piezoelectric elements 4 can expand and contract.

How the individual piezoelectric elements 4 expand or contract may be combined in any way other than specifically described here. For example, in FIGS. 2A to 2C, one of the left-side and right-side piezoelectric elements 4 may be made to expand while the other is made to contract. Even in this and like cases, the electrical conduction to the piezoelectric elements 4 is maintained.

Next, the variable-shape mirror of a second embodiment of the present invention will be described. Except for the structure of the mirror portion 3, the variable-shape mirror of the second embodiment has the same structure as the variable-shape mirror of the first embodiment, and therefore no overlapping description will be repeated. In the following description, such components as are found also in the first embodiment will be identified with common reference numerals.

Figure 3:
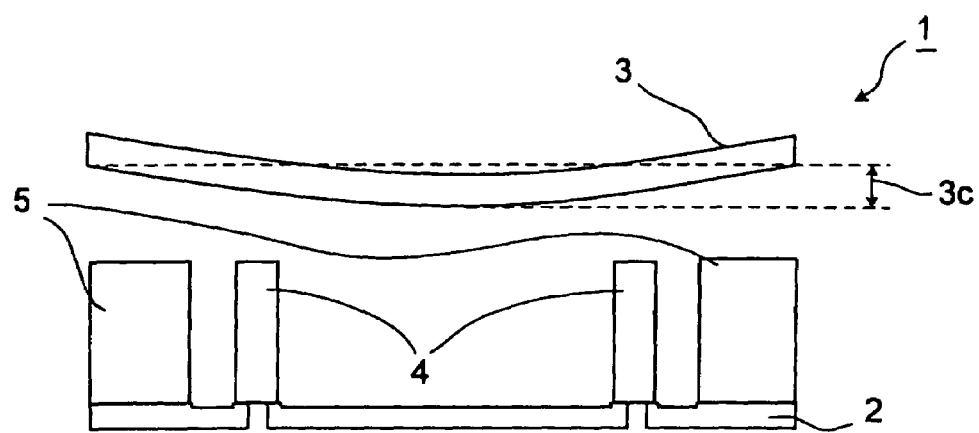
FIG. 3 is a sectional view of the variable-shape mirror of a second embodiment of the invention, as cut along line a-a shown in FIG. 1A.

FIG. 3 is a sectional view of the variable-shape mirror 1 as cut along line a-a shown in FIG. 1A. The mirror portion 3 is built as a concave-surfaced mirror having a concave mirror surface. In other respects, the mirror portion 3 is structured in the same manner as in the first embodiment, and therefore no further description thereof will be given.

The concave-surfaced mirror portion 3 is formed, for example, by laying together materials having different thermal contraction coefficients. Specifically, consider a case where the mirror portion 3 is built with a base portion and a mirror-surface portion built thereon. For example, the base portion is formed of silicon, and then, at a high temperature, aluminum is vapor-deposited or otherwise the mirror-surface portion is formed. When these are cooled down, since aluminum has a higher thermal contraction coefficient, a concave-surfaced mirror is obtained. The mirror portion 3 may be built with, instead of two layers, three or more layers. The degree of concavity $3c$ of the mirror portion 3 is determined in relation to the piezoelectric elements 4. Specifically, the degree of concavity $3c$ is so adjusted that the parts of the mirror portion 3 where it makes contact with the piezoelectric elements 4 are displaced as much as the piezoelectric elements 4 arranged on the support base 2 contract.

Figure 4A:
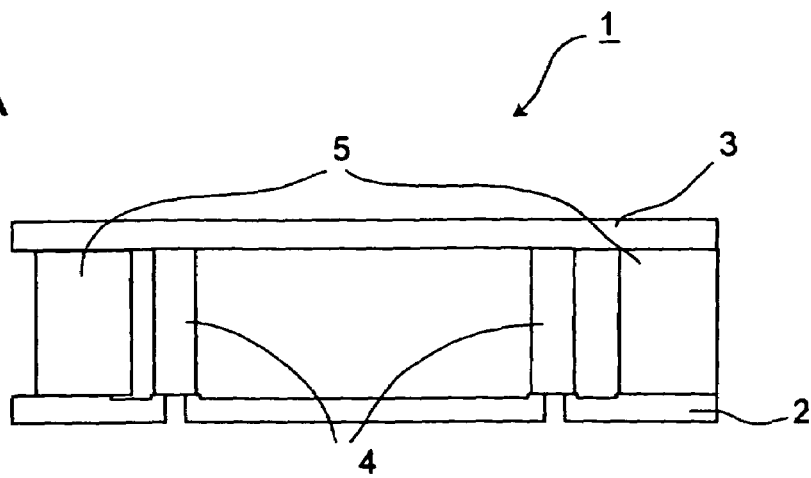
FIG. 4A is a sectional view of the variable-shape mirror of the second embodiment, as cut along line a-a shown in FIG. 1A, illustrating the operation of the variable-shape mirror.
Figure 4B:
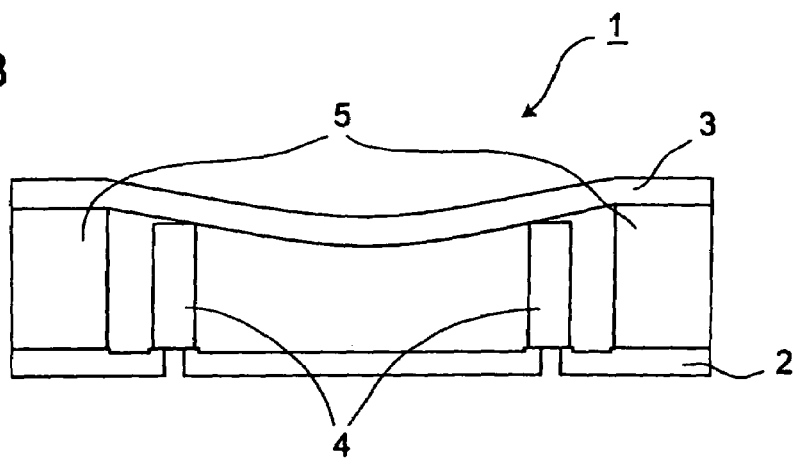
FIG. 4B is a sectional view of the variable-shape mirror of the second embodiment, as cut along line a-a shown in FIG. 1A, illustrating the operation of the variable-shape mirror.
Figure 4C:
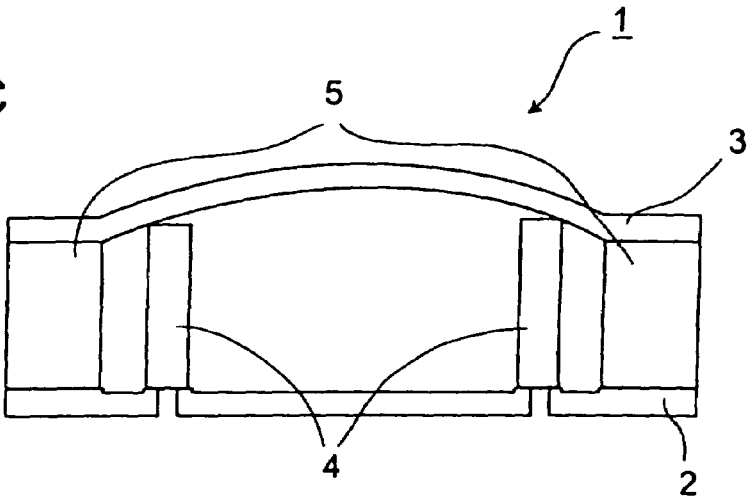
FIG. 4C is a sectional view of the variable-shape mirror of the second embodiment, as cut along line a-a shown in FIG. 1A, illustrating the operation of the variable-shape mirror.

Now, the operation of the variable-shape mirror 1 built with the mirror portion 3 described above will be described with reference to FIGS. 4A, 4B, and 4C. For example, as the piezoelectric elements 4 are driven, the variable-shape mirror 1 varies the shape thereof as shown in FIGS. 4A to 4C. FIGS. 4A to 4C are sectional views of the variable-shape mirror 1 as cut along line a-a shown in FIG. 1A.

FIG. 4A shows a state in which no voltage is applied to the piezoelectric elements 4. The mirror portion 3 receives a force from the piezoelectric elements 4, and is thereby held in a flat-plate shape. When a voltage is applied to the piezoelectric elements 4, they contract. FIG. 4B shows a state in which the piezoelectric elements 4 have contracted. When the piezoelectric elements 4 contract, the mirror portion 3, since it is convex from the beginning, tends to restore, by its counter-force, the shape shown in FIG. 4B from the state shown in FIG. 4A. Thus, if the degree of concavity $3c$ is so adjusted that the parts of the mirror portion 3 where it makes contact with the piezoelectric elements 4 are displaced as much as the piezoelectric elements 4 contract, even when the piezoelectric elements 4 have contracted, no gaps are left between the piezoelectric elements 4 and the mirror portion 3, and thus the electrical conduction to the piezoelectric elements 4 is maintained. FIG. 4C shows a state in which the piezoelectric elements 4 have expanded. In this way, the variable-shape mirror 1 permits the shape of the mirror surface of the mirror portion 3 to be varied all over the maximum range in which the piezoelectric elements 4 can expand and contract in the vertical direction, i.e., in a direction normal to the surface of the support base.

How the individual piezoelectric elements 4 expand or contract may be combined in any way other than specifically described here. For example, in FIGS. 4A to 4C, one of the left-side and right-side piezoelectric elements 4 may be made to expand while the other is made to contract. Even in this and like cases, the electrical conduction to the piezoelectric elements 4 is maintained.

Next, the variable-shape mirror of a third embodiment of the present invention will be described. In the following description, no description overlapping with that of the first and second embodiments will be repeated. In the following description, such components as are found also in the first or second embodiment will be identified with common reference numerals.

Figure 5:
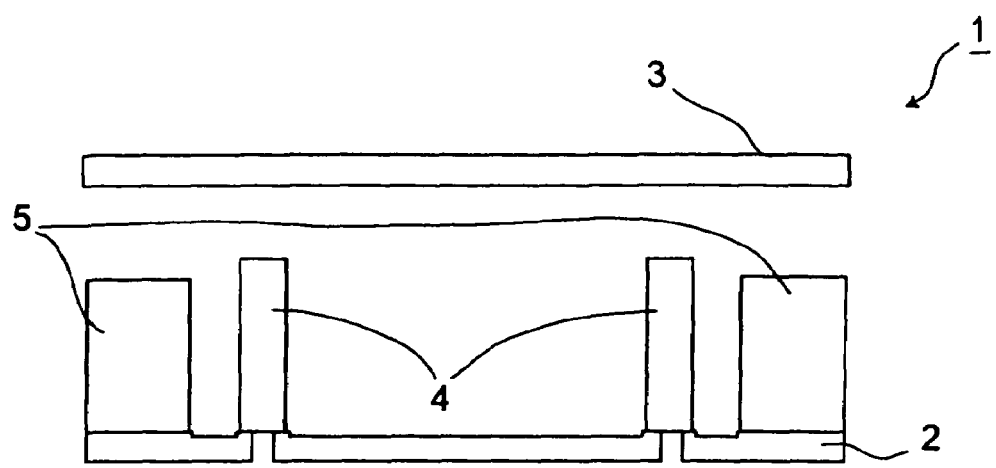
FIG. 5 is a sectional view of the variable-shape mirror of a third embodiment of the invention, as cut along line a-a shown in FIG. 1A.

FIG. 5 is a sectional view of the variable-shape mirror 1 as cut along line a-a shown in FIG. 1A. In the third embodiment, the mirror portion 3 is formed in the shape of a flat plate, and the piezoelectric elements 4 are given a greater height than the fixed portions 5. In this case, since the mirror portion 3 is flat-plate-shaped, the piezoelectric elements 4 need to be given an equal height. In other respects, the mirror portion 3 and the piezoelectric elements 4 are structured in the same manner as in the first embodiment, and therefore no further description thereof will be given.

Figure 6A:
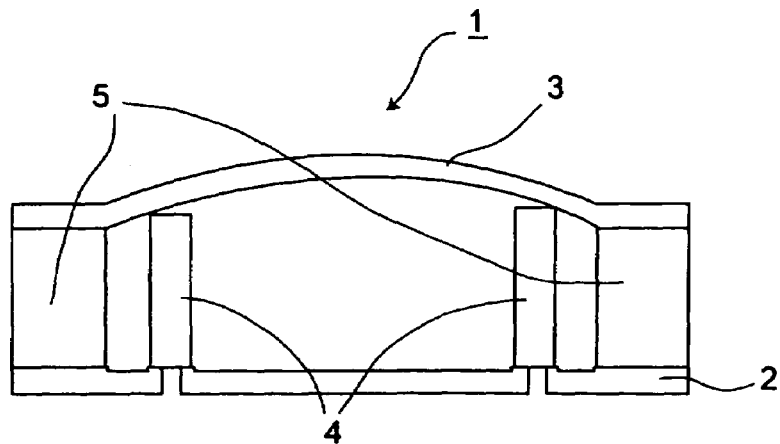
FIG. 6A is a sectional view of the variable-shape mirror of the third embodiment, as cut along line a-a shown in FIG. 1A, illustrating the operation of the variable-shape mirror.
Figure 6B:
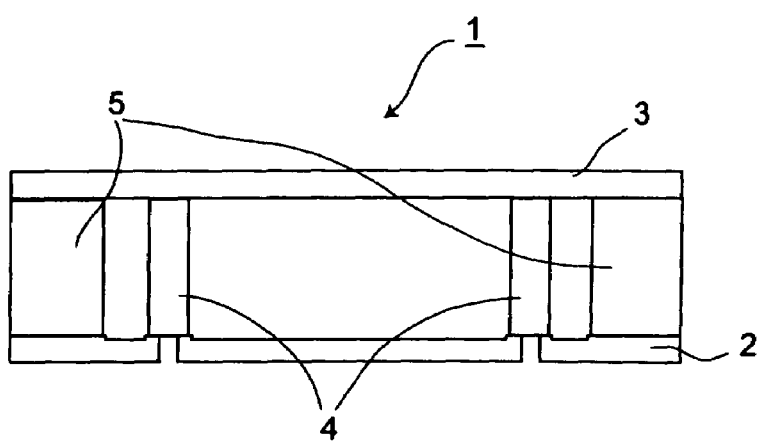
FIG. 6B is a sectional view of the variable-shape mirror of the third embodiment, as cut along line a-a shown in FIG. 1A, illustrating the operation of the variable-shape mirror.
Figure 6C:
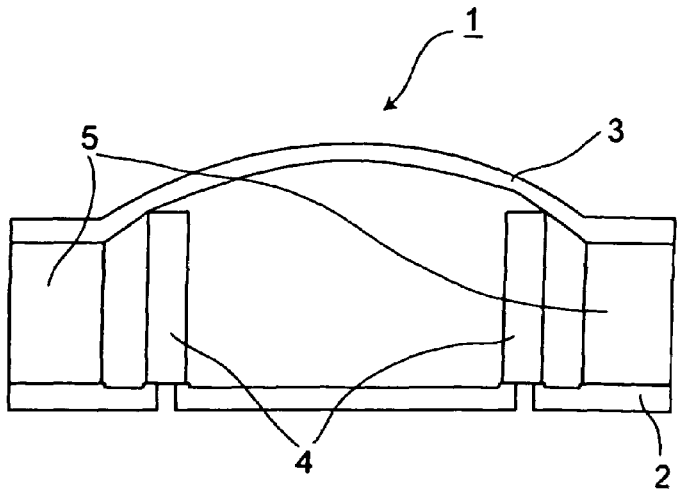
FIG. 6C is a sectional view of the variable-shape mirror of the third embodiment, as cut along line a-a shown in FIG. 1A, illustrating the operation of the variable-shape mirror.

Now, the operation of the variable-shape mirror 1 structured as described above will be described with reference to FIGS. 6A, 6B, and 6C. For example, as the piezoelectric elements 4 are driven, the variable-shape mirror 1 varies the shape thereof as shown in FIGS. 6A to 6C. FIGS. 6A to 6C are sectional views of the variable-shape mirror 1 as cut along line a-a shown in FIG. 1A.

FIG. 6A shows a state in which no voltage is applied to the piezoelectric elements 4. Since the piezoelectric elements 4 are longer than the fixed portions 5, the mirror portion 3 is warped. When a voltage is applied to the piezoelectric elements 4, they contract. FIG. 6B shows a state in which the piezoelectric elements 4 have contracted. When the piezoelectric elements 4 contract, the mirror portion 3, since it is originally flat-plate-shaped, tends to restore, by its counter-force, the shape shown in FIG. 6B from the state shown in FIG. 6A. Thus, if the difference between the height of the piezoelectric elements 4 and that of the fixed portions 5 is set to be longer than the distance over which the piezoelectric elements 4 contract, even when the piezoelectric elements 4 have contracted, no gaps are left between the piezoelectric elements 4 and the mirror portion 3, and the electrical conduction to the piezoelectric elements 4 is maintained. FIG. 6C shows a state in which the piezoelectric elements 4 have expanded. In this way, the variable-shape mirror 1 permits the shape of the mirror surface of the mirror portion 3 to be varied all over the maximum range in which the piezoelectric elements 4 can expand and contract in the vertical direction, i.e., in a direction normal to the surface of the support base.

How the individual piezoelectric elements 4 expand or contract may be combined in any way other than specifically described here. For example, in FIGS. 6A to 6C, one of the left-side and right-side piezoelectric elements 4 may be made to expand while the other is made to contract. Even in this and like cases, the electrical conduction to the piezoelectric elements 4 is maintained.

Figure 7:
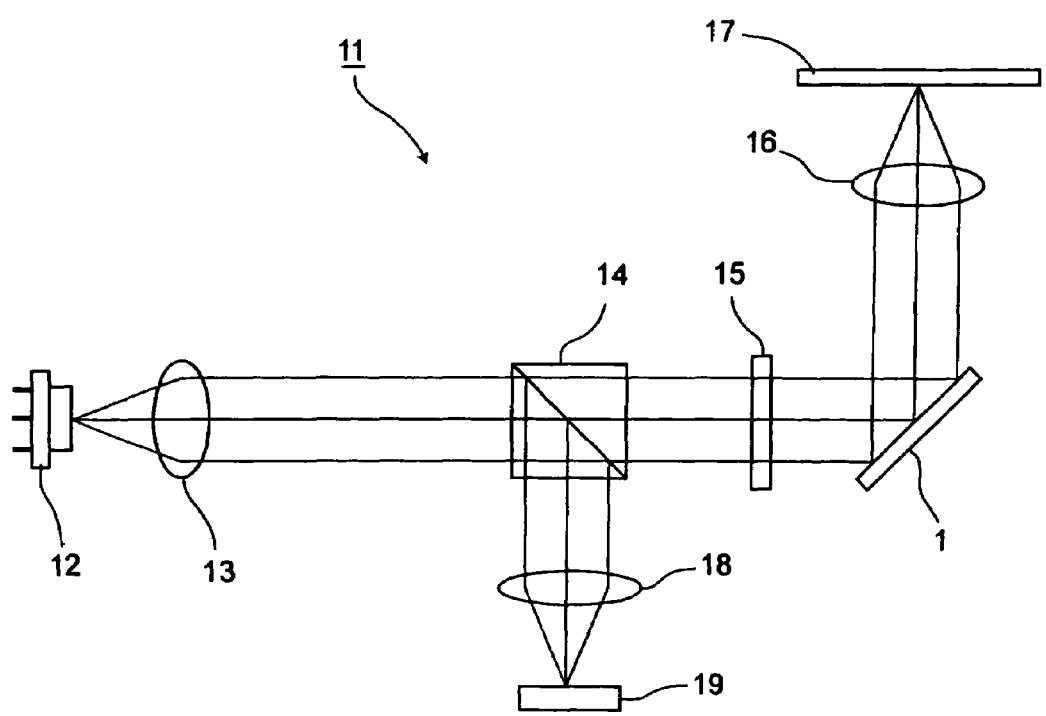
FIG. 7 is a diagram showing an outline of the optical system of an optical pickup device employing a variable-shape mirror embodying the present invention.

Next, as another embodiment of the present invention, an optical pickup device 11 employing a variable-shape mirror according to the present invention will be described. The optical pickup device 11 incorporating the variable-shape mirror 1 according to the present invention includes an optical system constructed, for example, as shown in FIG. 7. The optical system of the optical pickup device 11 may be constructed in any other manner within the objects of the present invention.

The variable-shape mirror 1 shown in FIG. 7 is provided with a semiconductor laser 12, a collimator lens 13, a beam splitter 14, a variable-shape mirror 1 according to the present invention, a quarter-wave plate 15, an objective lens 16, a condenser lens 18, and a photodetector 19.

The laser light emitted from the semiconductor laser 12 is converted into a parallel beam by the collimator lens 13. This parallel beam is transmitted through the beam splitter 14, then has its polarization state changed by the quarter-wave plate 15, is then reflected on the variable-shape mirror 1, and is then condensed by the objective lens 16 to be focused on an optical disc 17. The laser light reflected from the optical disc 17 passes through the objective lens 16, is then reflected on the variable-shape mirror 1, then passes through the quarter-wave plate 15, is then reflected by the beam splitter 14, and is then condensed by the condenser lens 18 to be directed to the photodetector 19.

In this embodiment, the variable-shape mirror 1 functions, on one hand, as a conventionally used raising mirror. On the other hand, in this optical system, for example, when the optical disc 17 becomes inclined relative to the optical axis of the laser light, as described earlier, coma aberration is produced. To correct this coma aberration, the shape of the mirror surface of the variable-shape mirror 1 is varied; that is, the variable-shape mirror 1 also serves to correct aberrations. Specifically, based on the signal obtained from the photodetector 19, when correction of wavefront aberrations such as coma aberration is necessary, a controller (unillustrated) provided in the optical pickup device 11 feeds a signal to the variable-shape mirror 1 to instruct it to vary the shape of the mirror portion 3 so as to correct the aberrations.

With a variable-shape mirror 1 according to the present invention, when the shape of the mirror surface is varied, the mirror surface does not develop local deformation. Thus, the mirror portion 3 offers a shape variation range that corresponds to the range of the expansion and contraction of the piezoelectric elements. This makes it possible to properly correct aberrations.

According to the present invention, in a variable-shape mirror that varies the shape of the mirror surface thereof, the piezoelectric elements are not bonded to the mirror portion. Thus, even when the piezoelectric elements contract, the mirror surface does not develop local deformation due to the piezoelectric elements and the mirror portion being bonded together.

Moreover, while the piezoelectric elements are not bonded to the mirror portion, the mirror portion is given a characteristic shape and the piezoelectric elements are given a characteristic size. Thus, even when the piezoelectric elements contract, it is possible to maintain the contact between the mirror portion and the piezoelectric elements, and thereby to maintain the electric conduction to the piezoelectric elements. In this way, it is possible to obtain a mirror shape variation range comparable with that obtained when the mirror portion and the piezoelectric elements are bonded together.

With an optical pickup device employing a variable-shape mirror according to the present invention, it is possible to prevent the mirror surface of the variable-shape mirror from local deformation, and to obtain a wide mirror shape variation range while preventing deformation. Thus, it is possible to surely correct aberrations in a wide range.

What is claimed is:

1. A variable-shape mirror comprising:

a support base;

a mirror portion having a lower surface thereof that is disposed to face the support base and having a mirror surface on a side thereof opposite to the lower surface;

a plurality of piezoelectric elements that are sandwiched between an upper surface of the support base and the mirror portion, that have one ends thereof in a direction of expansion and contraction making direct contact with the mirror portion and other ends thereof in the direction of expansion and contraction making direct contact with the upper surface of the support base, and that vary a shape of the mirror surface by expanding and contracting in a direction normal to the upper surface of the support base;

a plurality of fixed portions provided in an equal number as the plurality of piezoelectric elements, each of which making a pair with each of the plurality of piezoelectric elements, sandwiched between the support base and the mirror portion, and disposed closer to an outer edge of the mirror portion than is said each of the plurality of piezoelectric elements, wherein the mirror portion is disconnected from the plurality of piezoelectric elements and bonded only to the plurality of fixed portions, wherein a shape of the mirror portion in cross section before being disposed in the variable-shape mirror and lengths of the plurality of fixed portions and of the plurality of piezoelectric elements as measured from the upper surface of the support base to the lower surface of the mirror portion when the plurality of piezoelectric elements are not driven, are so structured and adjusted that the mirror portion is subjected to a force derived from a counterforce thereof so as to act upon the plurality of piezoelectric elements in a direction of contraction when the plurality of piezoelectric elements are not driven, wherein the shape of the mirror portion in cross section before being disposed in the variable-shape mirror is so structured to be identical with a shape of the mirror portion in cross section when the plurality of piezoelectric elements are all driven and fully contracted, and the shape of the mirror portion in cross section is so structured to become convex on a side of the mirror surface and concave on a side of the lower surface when the plurality of piezoelectric elements are all driven and fully expanded.

2. The variable-shape mirror of claim 1, wherein the shape of the mirror portion in cross section before being disposed in the variable-shape mirror is formed to become a flat-plate shape.

3. The variable-shape mirror of claim 2, wherein the length of the plurality of piezoelectric elements when the plurality of piezoelectric elements are not driven is set to become longer than the length of the plurality of fixed portions.

4. The variable-shape mirror of claim 3, wherein the mirror portion has projections, protruding from the lower surface thereof, formed in parts thereof where the mirror portion makes contact with the plurality of piezoelectric element, and
the length of the plurality of piezoelectric elements include a height of the projections in the direction normal.

5. The variable-shape mirror of claim 1,
wherein the shape of the mirror portion in cross section before being disposed in the variable-shape mirror is formed to become concave on the side of the mirror surface.

6. The variable-shape mirror of claim 2,
wherein the length of the plurality of piezoelectric elements when the plurality of piezoelectric elements are not driven is set to become identical with the length of the plurality of fixed portions.

7. The variable-shape mirror of claim 1,
wherein the plurality of piezoelectric elements and the plurality of fixed portions make four of said pair, and
the four pairs thus made are arranged symmetrically in cross-shaped directions in plan view.

8. An optical pickup device comprising the variable-shape mirror of claim 1.

9. A variable-shape mirror comprising:
a support base;
a mirror portion having a lower surface thereof that is disposed to face the support base and having a mirror surface on a side thereof opposite to the lower surface;
a plurality of piezoelectric elements that are sandwiched between an upper surface of the support base and the mirror portion, that have one ends thereof in a direction of expansion and contraction making direct contact with the mirror portion and other ends thereof in the direction of expansion and contraction making direct contact with the upper surface of the support base, and that vary a shape of the mirror surface by expanding and contracting in a direction normal to the upper surface of the support base;
a plurality of fixed portions provided in an equal number as the plurality of piezoelectric elements, each of which making a pair with each of the plurality of piezoelectric elements, sandwiched between the support base and the mirror portion, and disposed closer to an outer edge of the mirror portion than is said each of the plurality of piezoelectric elements,
wherein the mirror portion is disconnected from the plurality of piezoelectric elements and bonded only to the plurality of fixed portions,
wherein i) a shape of the mirror portion in cross section before being disposed in the variable-shape mirror is formed to become a flat-plate shape; ii) the mirror portion has projections, protruding from the lower surface thereof, formed in parts thereof where the mirror portion makes contact with the plurality of piezoelectric element; and iii) a sum of a length of the plurality of piezoelectric elements in the direction normal when the plurality of piezoelectric elements are not driven and a height of the projections is set to become longer than a length of the plurality of fixed portions in the direction normal, whereby the mirror portion is subjected to a force derived from a counterforce thereof so as to act upon the plurality of piezoelectric elements in a direction of contraction when the plurality of piezoelectric elements are not driven,
wherein the shape of the mirror portion in cross section before being disposed in the variable-shape mirror is so structured to be identical with a shape of the mirror portion in cross section when the plurality of piezoelectric elements are all driven and fully contracted,
wherein the shape of the mirror portion in cross section is so structured to become convex on a side of the mirror surface and concave on a side opposite thereto when the plurality of piezoelectric elements are all driven and fully expanded, and
wherein the plurality of piezoelectric elements and the plurality of fixed portions make four of said pair, and the four pairs thus made are arranged symmetrically in cross-shaped directions in plan view.

10. A variable-shape mirror comprising:
a support base;
a mirror portion having a lower surface thereof that is disposed to face the support base and having a mirror surface on a side thereof opposite to the lower surface;
a plurality of piezoelectric elements that are sandwiched between an upper surface of the support base and the mirror portion, that have one ends thereof in a direction of expansion and contraction making direct contact with the mirror portion and other ends thereof in the direction of expansion and contraction making direct contact with the upper surface of the support base, and that vary a shape of the mirror surface by expanding and contracting in a direction normal to the upper surface of the support base;
a plurality of fixed portions provided in an equal number as the plurality of piezoelectric elements, each of which making a pair with each of the plurality of piezoelectric elements, sandwiched between the support base and the mirror portion, and disposed closer to an outer edge of the mirror portion than is said each of the plurality of piezoelectric elements,
wherein the mirror portion is disconnected from the plurality of piezoelectric elements and bonded only to the plurality of fixed portions,
wherein i) a shape of the mirror portion in cross section before being disposed in the variable-shape mirror is formed to become concave on a side of the mirror surface, and ii) a length of the plurality of piezoelectric elements in the direction normal when the plurality of piezoelectric elements are not driven is set to become identical with a length of the plurality of fixed portions in the direction normal, whereby the mirror portion is subjected to a force derived from a counterforce thereof so as to act upon the plurality of piezoelectric elements in a direction of contraction when the plurality of piezoelectric elements are not driven,
wherein the shape of the mirror portion in cross section before being disposed in the variable-shape mirror is so structured to be identical with a shape of the mirror portion in cross section when the plurality of piezoelectric elements are all driven and fully contracted,
wherein the shape of the mirror portion in cross section is so structured to become convex on the side of the mirror surface and concave on a side opposite thereto when the plurality of piezoelectric elements are all driven and fully expanded, and
wherein the plurality of piezoelectric elements and the plurality of fixed portions make four of said pair, and the four pairs thus made are arranged symmetrically in cross-shaped directions in plan view.

11. A variable-shape mirror comprising:
a support base;
a mirror portion having a lower surface thereof that is disposed to face the support base and having a mirror surface on a side thereof opposite to the lower surface;
a plurality of piezoelectric elements that are sandwiched between an upper surface of the support base and the mirror portion, that have one ends thereof in a direction of expansion and contraction making direct contact with the mirror portion and other ends thereof in the direction of expansion and contraction making direct contact with the upper surface of the support base, and that vary a shape of the mirror surface by expanding and contracting in a direction normal to the upper surface of the support base;

a plurality of fixed portions provided in an equal number as the plurality of piezoelectric elements, each of which making a pair with each of the plurality of piezoelectric elements, sandwiched between the support base and the mirror portion, and disposed closer to an outer edge of the mirror portion than is said each of the plurality of piezoelectric elements, wherein the mirror portion is disconnected from the plurality of piezoelectric elements and bonded only to the plurality of fixed portions, wherein i) a shape of the mirror portion in cross section before being disposed in the variable-shape mirror is formed to become a flat-plate shape, and ii) a length of the plurality of piezoelectric elements in the direction normal when the plurality of piezoelectric elements are not driven is set to become longer than a length of the plurality of fixed portions in the direction normal, whereby the mirror portion is subjected to a force derived from a counterforce thereof so as to act upon the plurality of piezoelectric elements in a direction of contraction when the plurality of piezoelectric elements are not driven, wherein the shape of the mirror portion in cross section before being disposed in the variable-shape mirror is so structured to be identical with a shape of the mirror portion in cross section when the plurality of piezoelectric elements are all driven and fully contracted, wherein the shape of the mirror portion in cross section is so structured to become convex on the side of the mirror surface and concave on a side opposite thereto when the plurality of piezoelectric elements are all driven and fully expanded, and wherein the plurality of piezoelectric elements and the plurality of fixed portions make four of said pair, and the four pairs thus made are arranged symmetrically in cross-shaped directions in plan view.

* * * * *